(No Model.)
T. F. KRAJEWSKI.
EVAPORATING PAN.
No. 326,299. Patented Sept. 15, 1885.
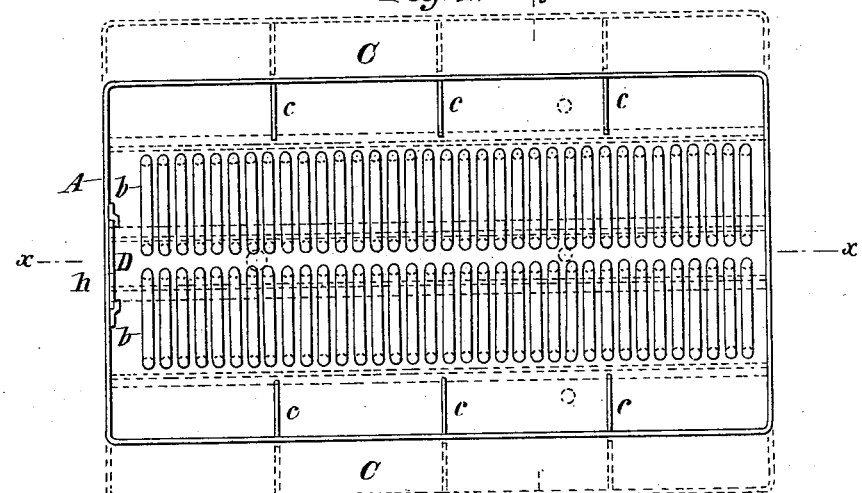
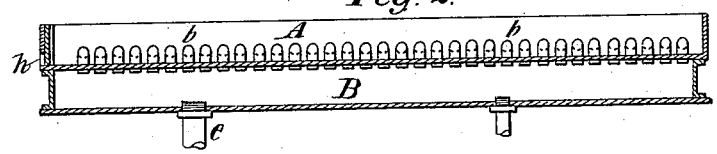
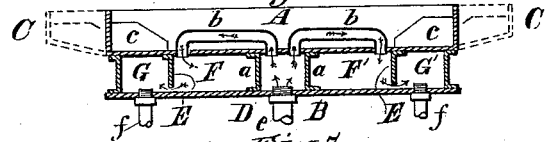
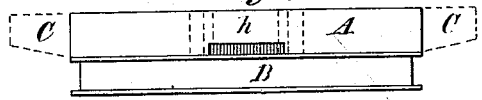
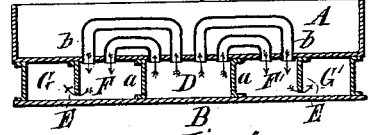
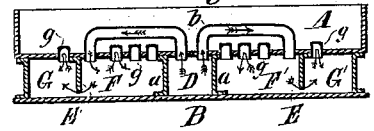
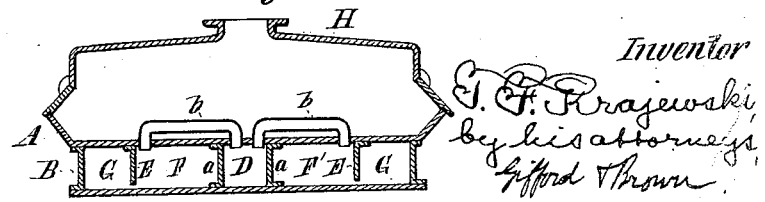
Witnesses
E. J. Roche
Wm. G. Lipsey
Inventor
T. F. Krajewski,
by his attorneys
Gifford Brown
N. PETERS, Photo-Lithographer, Washington, D. C.

UNITED STATES PATENT OFFICE.

THOMAS F. KRAJEWSKI, OF NEW YORK, N. Y.

EVAPORATING-PAN.

SPECIFICATION forming part of Letters Patent No. 326,299, dated September 15, 1885.

Application filed March 9, 1885. (No model.)

*To all whom it may concern:*

Be it known that I, THOMAS F. KRAJEWSKI, of New York, in the county of New York and State of New York, have invented a certain new and useful Improvement in Evaporating-Pans, of which the following is a specification.

I will describe in detail an evaporating-pan embodying my improvement, and then point out the novel features in claims.

In the accompanying drawings, Figure 1 is a plan or top view of an evaporating-pan embodying my improvement. Fig. 2 is a longitudinal section thereof, taken on the plane of the line $x\ x$, Fig. 1. Fig. 3 is a transverse section thereof, taken on the plane of the line $y\ y$, Fig. 1. Fig. 4 is a transverse section of an evaporating-pan of modified form embodying my improvement. Fig. 5 is a transverse section of another modification thereof. Fig. 6 is a transverse section of my evaporating-pan, showing the same provided with a top or cover; and Fig. 7 is an end view of the pan shown in Figs. 1, 2, and 3.

Similar letters of reference designate corresponding parts in all the figures.

A designates the pan. It is made of any desired metal, and, as shown, is oblong, or has two long sides and two short sides. It may, however, be of different form. It is provided with a bottom, as is usual.

The pan is arranged above the main portion of an inclosed heating-chamber, B. Said heating-chamber preferably extends throughout its length. In most pans embodying my improvement it is desirable to have the heating-chamber extend beneath the entire surface of the bottom of the pan, in order that the pan may be subjected to more or less heat; but it is sometimes advantageous to have two opposite sides of the pan extend for a distance beyond the heating-chamber, in order to provide a cooling-surface for the liquid being evaporated. Such an arrangement is shown in dotted lines at C in Figs. 1 and 3.

The heating-chamber is divided into compartments, of which I have shown five, but which may be of any desired number. The first of these compartments, D, is arranged about midway the width of the heating-chamber, and extends throughout the length of the chamber. It is formed by vertical partitions $a$ extending between the bottom of the pan and the bottom of the heating-chamber. These partitions may be secured to the bottom of the pan and the bottom of the heating-chamber by rivets or otherwise, if desired; or the pan may simply rest upon them. They serve also as a support to the pan near its center.

E designates other partitions, which are arranged at a distance from the partitions B and nearer two opposite sides of the heating-chamber. These partitions are secured by rivets, or in any other suitable manner, to the bottom of the pan, and extend throughout its length approximately parallel to the partition B. They do not, as shown, extend quite to the bottom of the heating-chamber; but a space is left between the lower edge of each and the bottom of the heating-chamber. They might, however, extend to the bottom of the heating-chamber, a series of perforations therein near their lower edges taking the place of the spaces referred to. By the use of these last-named partitions E compartments F F' are formed in the heating-chamber between the partitions E and the partitions $a$. Between the partitions E and the adjacent sides of the heating-chamber other compartments, G G', are formed.

In the example of my improvement shown in Figs. 1, 2, and 3 the compartments D and F F' intercommunicate by means of pipes or passages $b$. These pipes or passages $b$ constitute part of the heating-chamber. Each of these pipes or passages extends, as shown, transversely to the length of the pan above the bottom of the same. As shown, these pipes or passages are arranged in two rows extending throughout the length of the pan. Each of the pipes or passages of one of said rows communicates at one end with the compartment D, and at the other end with the compartments F, and each of the pipes or passages of the other row communicates at one end with the compartment D and at the other with the compartment F'.

In evaporating the liquid it is desirable to prevent a movement of the same in the direction of the length of the pan near the sides thereof, as shown in this example of my improvement, as thereby the scum which ensues from the boiling may be better collected at two opposite sides of the pan, and more easily removed. For this purpose I have shown vertically-arranged aprons or partitions $c$ extending inward from the sides of the pan, These partitions c form compartments d along two opposite sides of the pan, in which the scum readily collects, and from which it may be removed as desired.

Steam enters the compartment D through a supply-pipe, e, or in any other convenient manner. It passes upwardly, entering the pipes or passages b, which it traverses, issuing thence at the other ends thereof into the compartments F F'. From the compartments F F' it passes downwardly beneath the partitions E, and enters the compartments G G', from which the water of condensation is conveyed away through suitable pipes, f. Liquid to be treated having been introduced into the pan A to a sufficient depth, but which will preferably be somewhat above the plane of tops of the pipes or passages b, steam is introduced into the compartment D. The steam in its state of greatest heat therefore encounters the bottom of the pan A near the center throughout the entire length thereof. The liquid in the pan, therefore, which is above the compartment D soonest becomes heated, and is the first to boil. The steam traversing the pipes or passages b discharges a portion of its caloric into the surrounding liquid near the surface of the same. When the steam enters the compartments F F', it is cooler than it was when it entered the compartment D. The portions of the liquid, therefore, which are above the compartments F F' are subjected to less heat than that portion of the liquid which is above the compartment D. The steam upon entering the compartments G G' is still cooler than when it entered the compartments F F', and the portions of the liquid which are above the compartments G G' are subjected to still less heat than those which are above the compartments F F'. It will therefore be observed that the liquid in the pan is subjected to gradually-decreasing degrees of heat from the center toward two opposite sides, the hottest being at the center and the coolest at the sides. By this means currents are provided in the liquid which move in one direction from the center of the pan near the top of the liquid toward two opposite sides thereof, and returning pass downwardly at said sides of the pan, and thence near the bottom thereof to the center, where the circuit is completed. This motion of the liquid is increased by the fact that the pipes or passages b, being near the surface of the liquid for the greater part of their lengths, render the portions of the liquid near the surface and which is moving toward the sides of the pan hotter than that portion which is returning near the bottom of the pan. By this motion of the liquid, also, the scum is moved constantly toward two opposite sides of the pan, and the liquid is, as it were, filtered through the accumulated scum at said sides of the pan, leaving its impurities in the scum. This I consider an important feature, as by so filtering the liquid through the scum little or no subsequent filtration of the liquid is required. When the cooling-surfaces at the sides of the pan shown in Figs. 1 and 3 are used, still more active currents may be induced, owing to the rapid cooling of the liquid at those places, and when the bottoms of these cooling-surfaces are inclined, as shown, the inclination will conduce to such circulation.

The liquid, when sufficiently condensed, may be conveyed away from the pan by any suitable means. I have shown a gate, h, for that purpose.

I may, if desired, place a top or cover, H, upon the pan A, in order to facilitate the process of boiling the liquid. In such case I may, if desired, connect said top or cover with suitable apparatus for creating a vacuum within the inclosed pan or connect said pan with suitable condensing apparatus. When a top or cover is employed, the sides of the pan may extend somewhat obliquely outward. Suitable packing to secure an air-tight joint may be inserted between the meeting edges of the cover and pan, if desired. Openings closed by doors or otherwise may be arranged along sides of the top or cover adjacent to the pan, through which scum may be removed from the pan.

In the example of my improvement illustrated in Fig. 4, I have shown two sets of pipes b, in each row, one set being arranged above the other. The pipes of each set of one row connect at one end with the compartment D and at the other with the compartment F, and the pipes of each set of the other row connect at one end with the compartment D and at the other with the compartment F'.

In the example of my improvement illustrated in Fig. 5, I have shown thimbles or caps g arranged in the bottom of the pan, and having their open ends communicating with the compartments F F' and G G'. Steam may enter these thimbles or caps.

By the arrangement of parts shown in Figs. 4 and 5 the heating-surface is increased.

Obviously, one row of pipes b may be used instead of two, in which case it is preferable to arrange said row close up to one side of the pan. The currents in the liquid would then set toward the other side of the pan and return near the bottom. A series of these pans may be connected up together in any convenient manner, if desirable.

It will be observed that the compartment D, the pipes b, the compartments F F', and the compartments G G' constitute sinuous passages for the steam, through which the steam circulates toward opposite sides of the pan. The steam-inlet is at about the middle of the width of the heating-chamber, and the outlets near the sides of the heating-chamber, so as to effect the desired circulation.

I do not wish to be understood as limiting myself to the particular shape of the pipes b shown, nor to the exact number of compartments shown in the heating-chamber, as the same may be varied by adding or removing partitions similar to the partitions E.

What I claim as my invention, and desire to secure by Letters Patent, is—

1. The combination of a pan and a heating-chamber so arranged that liquid in the pan will be subjected to varying degrees of heat in a direction from the center toward two opposite sides, substantially as specified.

2. The combination of a pan, a heating-chamber, and intercommunicating compartments in the heating chamber, whereby liquid in the pan will be subjected to varying degrees of heat, substantially as specified.

3. The combination of a pan, a heating-chamber, compartments in the heating-chamber, and pipes or passages connecting said compartments, substantially as specified.

4. The combination, with a pan, of a heating-chamber having a sinuous passage for the circulation of steam, substantially as specified.

5. The combination, with a pan, of a heating-chamber having sinuous passages for the circulation of steam extending in opposite directions, substantially as specified.

6. The combination of a pan, a heating-chamber, a compartment into which steam enters, and pipes or passages opening at one end into said compartment, extending thence into the pan, and opening at their other ends into a second compartment, substantially as specified.

7. The combination of the pan A, the heating-chamber B, the compartment D, pipes or passages $b$, the compartments F F', the partitions E, and the compartments G G', substantially as specified.

8. The combination of a pan, a heating-chamber, compartments in the heating-chamber, pipes or passages connecting the compartments and cooling-surfaces at opposite sides of the pan beyond the heating-chamber, substantially as specified.

9. The combination of a pan, a heating-chamber, and aprons or partitions $c$ in the pan, substantially as specified.

10. The combination of a pan, a heating-chamber, compartments in the heating-chamber, pipes or passages connecting the compartments, and a top or cover for the pan, substantially as specified.

THOS. F. KRAJEWSKI.

Witnesses:
T. J. KEANE,
W. G. GIPSEY.